Patented Nov. 28, 1950

2,531,404

UNITED STATES PATENT OFFICE 2,531,404

BIGUANIDE COMPOUNDS

Francis Henry Swinden Curd and Francis Leslie Rose, Blackley, Manchester, England, assignors to Imperial Chemical Industries Limited, a corporation of Great Britain No Drawing. Application February 25, 1948, Serial No. 10,928

2 Claims. (Cl. 260—565)

This invention relates to new compounds and more particularly it relates to compounds which are useful as antimalarial agents. The present application is a continuation-in-part of copending applications Serial Nos. 595,892, now U. S. Patent No. 2,467,371, 701,094, now abandoned, and 718,594 now abandoned.

An object of the present invention is to provide new compounds having chemotherapeutic properties and being useful in the treatment of malaria. Other and further important objects of this invention will appear as the description proceeds.

These objects are attained by the present invention according to which there are provided new biguanide derivatives of the general formula

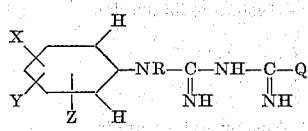

wherein Z represents a halogen atom of atomic weight above that of fluorine, that is an atom selected from the group consisting of chlorine, bromine and iodine; X and Y represent atoms or radicals selected from the group consisting of hydrogen, halogen and lower alkyl (1 to 3 carbon atoms); Q represents the radical of a nitrogenous base selected from the group consisting of monoalkylamines and dialkylamines, provided that the number of carbon atoms contained in Q is more than one and fewer than 8, and R represents an atom or radical selected from the group consisting of hydrogen and lower alkyl.

Stated in different words, our novel compounds may be defined by the general formula:

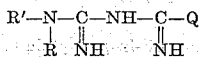

wherein R' is a benzenoid hydrocarbon radical carrying at least one and not more than 3 halogen atoms in its meta and para positions, the halogen being preferably one of atomic weight higher than that of fluorine and the ortho-positions of the aryl radical being preferably unsubstituted, while R and Q have the meanings above indicated.

The new biguanide derivatives may be made for example by the method described in copending application Serial No. 595,892, viz., by causing a substituted aryldicyandiamide of the formula:

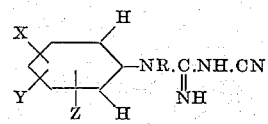

wherein X, Y, Z and R have the significance indicated above, to react with a nitrogenous base of the formula QH, wherein Q has the significance given above. The reaction may conveniently be brought about by heating the reagents together, if desired in presence of a solvent or diluent which for convenience may be an excess of the nitrogenous base QH when this is liquid under the conditions of reaction employed.

The nitrogenous compound QH may be used either in the form of the free base or in the form of a salt for example the hydrochloride. Further the reaction may be advantageously be carried out in the presence of a metal such as zinc or copper which may be used as such or in the form of an oxide, hydroxide, or salt or as a pre-formed addition compound with the amine. There may be used for instance copper powder, hydrated copper oxide, copper sulphate or zinc chloride. In such cases the presence of the metal increases the speed of the reaction and improves the yield of biguanide. Also the biguanide can frequently be conveniently isolated directly from the reaction mixture in the form of a sparingly soluble complex with the metal salt.

The biguanide derivatives of the present invention may also be made by the process described in copending application Serial No. 701,094, viz., by causing a substituted dicyandiamide of the formula:

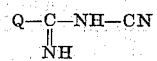

wherein Q has the significance given above, to react with an arylamine of the formula

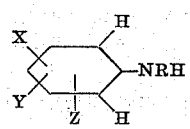

wherein X, Y, Z and R have the significance given above. This reaction may conveniently be brought about by heating the substituted dicyandiamide with a salt, for example the hydrochloride of the arylamine in presence of a solvent, for example water or an organic hydroxylic solvent such as methanol, ethanol or β-ethoxyethanol.

Again the biguanide derivatives of the present invention may be made by the processes described in copending application Serial No. 718,594, viz., by interaction of a guanidine derivative of the formula:

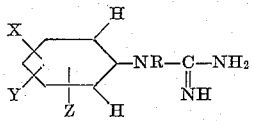

wherein X, Y, Z and R have the significance given above, with a cyanamide derivative of the formula: Q—CN, wherein Q has the significance stated above, or by interaction of a guanidine derivative of the formula:

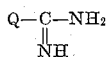

wherein Q has the significance stated above, with a cyanamide derivative of the formula:

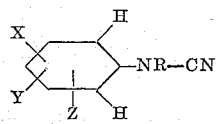

wherein X, Y, Z and R have the significance stated above.

These reactions may conveniently be effected by heating the reagents together, optionally in the presence of a solvent or diluent. The guanidine derivative may be used in the form of the free base or, if desired, as a salt such as the hydrochloride, carbonate or sulphate. Where the cyanamide is mono-substituted (and hence acidic in nature) it may, if desired, be used in the form of a salt with a base, the guanidine derivative being then used also in the form of a salt. The new compounds of the present invention may also be made by the several processes set forth in copending applications Serial Nos. 720,096, 723,450, both now abandoned and 3,816 (of 1948), now U. S. Patent 2,509,376.

The novel compounds of this invention are all characterised by a common structure, as expressed by the above general formula, and by substantially common physical and chemical characteristics. Outstanding among their properties is the pharmaceutical property of being excellent antimalarial agents. Our novel compounds constitute synthetic substitutes for quinine of a high order of efficiency. While the degree of efficacy as to antimalarial agent will, it will be understood, vary from one individual to the next, we have tested so large a number of members of the general class against avian malaria that it may safely be postulated that all the compounds of the class have good antimalarial properties. Among the numerous compounds actually tested by us in avian malaria and found to be effective against both erythrocytic and exoerythrocytic forms of the parasite the following substances may be named.

$N^1$-p-chlorophenyl-$N^5$ :$N^5$-diethylbiguanide

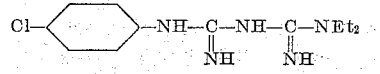

$N^1$-p-chlorophenyl-$N^5$-methyl-$N^5$-isopropylbiguanide

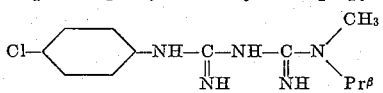

$N^1$-p-chlorophenyl-$N^5$-ethylbiguanide
$N^1$-p-chlorophenyl-$N^5$-n-amylbiguanide
$N^1$-p-chlorophenyl-$N^5$-n-propylbiguanide
$N^1$-p-chlorophenyl-$N^5$-isopropylbiguanide
$N^1$-p-chlorophenyl-$N^5$-n-butylbiguanide
$N^1$-p-chlorophenyl-$N^5$-isopropylbiguanide
$N^1$-p-chlorophenyl-$N^5$-tert-butylbiguanide
$N^1$-p-chlorophenyl-$N^5$-methyl-$N^5$-n-propylbiguanide
$N^1$-p-chlorophenyl-$N^1$-methyl-$N^5$ :$N^5$-diethylbiguanide Cl—⟨ ⟩—NCH₃—C(=NH)—NH—C(=NH)—N(Et)(Et)

$N^1$-p-chlorophenyl-$N^1$-methyl-$N^5$-isopropylbiguanide
$N^1$-m-chlorophenyl-$N^5$-isopropylbiguanide
$N^1$-m-chlorophenyl-$N^5$-methyl-$N^5$-isopropylbiguanide
$N^1$-m-chlorophenyl-$N^5$ :$N^5$-diethylbiguanide
$N^1$-m-chlorophenyl-$N^5$-n-propylbiguanide
$N^1$-m-chlorophenyl-$N^5$-ethylbiguanide
$N^1$-3-chloro-4-methylphenyl-$N^5$-isopropylbiguanide
$N^1$-3-methyl-4-chlorophenyl-$N^5$-isopropylbiguanide
$N^1$-3 :4-dichlorophenyl-$N^5$-isopropylbiguanide Cl—⟨ ⟩(Cl)—NH—C(=NH)—NH—C(=NH)—NHPrᵝ

$N^1$-3 :5-dichlorophenyl-$N^5$-isopropylbiguanide
$N^1$-3 :4 :5-trichlorophenyl-$N^5$-isopropylbiguanide
$N^1$-3 :4 :5-trichlorophenyl-$N^5$-n-propylbiguanide
$N^1$-3 :4 :5-trichlorophenyl-$N^5$-methyl-$N^5$-isopropylbiguanide
$N^1$-p-bromophenyl-$N^5$-ethylbiguanide Br—⟨ ⟩—NHCNHCNHEt (with NH, NH)

$N^1$-p-bromophenyl-$N^5$-n-propylbiguanide
$N^1$-p-bromophenyl-$N^5$-n-butylbiguanide
$N^1$-p-bromophenyl-$N^5$-sec.butylbiguanide
$N^1$-p-bromophenyl-$N^5$-diethylbiguanide Br—⟨ ⟩—NHCNHCN(C₂H₅)₂ (with NH, NH)

$N^1$-p-bromophenyl-$N^5$-methyl-$N^5$-isopropylbiguanide
$N^1$-p-bromophenyl-$N^5$-methyl-$N^5$-n-propylbiguanide
$N^1$-p-bromophenyl-$N^5$-methyl-$N^5$-n-butylbiguanide
$N^1$-m-iodophenyl-$N^5$-isopropylbiguanide ⟨ ⟩(I)—NHCNHCNHPrᵝ (with NH, NH)

$N^1$-p-iodophenyl-$N^5$-isopropylbiguanide
$N^1$-p-iodophenyl-$N^5$-n-propylbiguanide
$N^1$-p-iodophenyl-$N^5$-ethylbiguanide
$N^1$-p-iodophenyl-$N^5$-n-butylbiguanide
$N^1$-p-iodophenyl-$N^5$-methyl-$N^5$-isopropylbiguanide
$N^1$-p-iodophenyl-$N^5$-methyl-$N^5$-n-propylbiguanide
$N^1$-3 :4-dibromophenyl-$N^5$-isopropylbiguanide Br—⟨ ⟩(Br)—NHCNHCNHPrᵝ (with NH, NH)

$N^1$-3-bromo-4-chlorophenyl-$N^5$-isopropylbiguanide
$N^1$-3-bromo-4-chlorophenyl-$N^5$-ethylbiguanide
$N^1$-3-bromo-4-chlorophenyl-$N^5$-methyl-$N^5$-isopropylbiguanide
$N^1$-3-bromo-4-iodophenyl-$N^5$-isopropylbiguanide
$N^1$-3-bromo-4-iodophenyl-$N^5$-methyl-$N^5$-isopropylbiguanide I—⟨ ⟩(Br)—NHCNHCN(Me)(Prᵝ) (with NH, NH)

$N^1$-3-iodo-4-chlorophenyl-$N^5$-isopropylbiguanide

Cl—⟨ ⟩(Br)—NHCNHCNHPrᵝ (with NH, NH)

$N^1$-3-iodo-4-chlorophenyl-$N^5$-n-propylbiguanide
$N^1$-3-iodo-4-chlorophenyl-$N^5$-ethylbiguanide
$N^1$-3-iodo-4-chlorophenyl-$N^5$-methyl-n-propylbiguanide
$N^1$-3-iodo-4-bromophenyl-$N^5$-isopropylbiguanide
$N^1$-3-iodo-4-bromophenyl-$N^5$-methyl-n-propylbiguanide
$N^1$-3 :4-diiodophenyl-$N^5$-isopropylbiguanide
$N^1$-3-chloro-4-bromophenyl-$N^5$-isopropylbiguanide
$N^1$-3-chloro-4-bromophenyl-$N^5$-n-propylbiguanide
$N^1$-3-chloro-4-bromophenyl-$N^5$-ethylbiguanide
$N^1$-3-chloro-4-bromophenyl-$N^5$-methyl-$N^5$-isopropylbiguanide
$N^1$-3-chloro-4-bromophenyl-$N^5$-methyl-$N^5$-n-propylbiguanide $N^1$-3-chloro-4-iodophenyl-$N^5$-isopropylbiguanide
$N^1$-3-chloro-4-iodophenyl-$N^5$-n-propylbiguanide
$N^1$-3-chloro-4-iodophenyl-$N^5$-methyl-$N^5$-isopropylbiguanide
$N^1$-3-chloro-4-iodophenyl-$N^5$-methyl-$N^5$-n-propylbiguanide
$N^1$-3:5-dichloro-4-bromophenyl-$N^5$-isopropylbiguanide $$Br-\underset{Cl}{\underset{|}{\overset{Cl}{\overset{|}{\bigcirc}}}}-NHCNHCNHPr^\beta$$
$$\quad\quad\quad\quad\|\ \ \|$$
$$\quad\quad\quad\quad NH\ NH$$

Other specific compounds of this invention include:

$N^1$-m-bromophenyl-$N^5$-methyl-$N^5$-isopropylbiguanide
$N^1$-m-bromophenyl-$N^5$-methyl-$N^5$-n-propylbiguanide
$N^1$-m-iodophenyl-$N^5$-methyl-$N^5$-isopropylbiguanide
$N^1$-m-iodophenyl-$N^5$-methyl-$N^5$-n-propylbiguanide
$N^1$-3:4-dibromophenyl-$N^5$-ethylbiguanide
$N^1$-3:4-dibromophenyl-$N^5$-methyl-$N^5$-n-propylbiguanide
$N^1$-3-bromo-4-iodophenyl-$N^5$-methyl-$N^5$-n-propylbiguanide
$N^1$-3-iodo-4-bromophenyl-$N^5$-methyl-$N^5$-isopropylbiguanide
$N^1$-3-iodo-4-bromophenyl-$N^5$-n-propylbiguanide
$N^1$-3:4-diiodophenyl-$N^5$-ethylbiguanide
$N^1$-3:4-diiodophenyl-$N^5$-methyl-$N^5$-n-propylbiguanide
$N^1$-3-n-propylbiguanide
$N^1$-3:5-dichloro-4-bromophenyl-$N^5$-ethylbiguanide
$N^1$-3:5-dichloro-4-bromophenyl-$N^5$-n-propylbiguanide
$N^1$-3:5-dichloro-4-bromophenyl-$N^5$-methyl-$N^5$-isopropylbiguanide
$N^1$-3:5-dichloro-4-bromophenyl-$N^5$-methyl-$N^5$-n-propylbiguanide
$N^1$-4-iodo-3-methylphenyl-$N^5$-isopropylbiguanide
$N^1$-4-iodo-3-methylphenyl-$N^5$-n-propylbiguanide
$N^1$-4-iodo-3-methylphenyl-$N^5$-ethylbiguanide
$N^1$-4-iodo-3-methylphenyl-$N^5$-methyl-$N^5$-isopropylbiguanide
$N^1$-4-iodo-3-methylphenyl-$N^5$-methyl-$N^5$-n-propylbiguanide
$N^1$-4-bromo-3-methylphenyl-$N^5$-isopropylbiguanide
$N^1$-4-bromo-3-methylphenyl-$N^5$-ethylbiguanide
$N^1$-4-bromo-3-methylphenyl-$N^5$-n-propylbiguanide
$N^1$-4-bromo-3-methylphenyl-$N^5$-methyl-$N^5$-isopropylbiguanide
$N^1$-4-bromo-3-methylphenyl-$N^5$-methyl-$N^5$-n-propylbiguanide
$N^1$-3-iodo-4-methylphenyl-$N^5$-isopropylbiguanide
$N^1$-3-iodo-4-methylphenyl-$N^5$-n-propylbiguanide
$N^1$-3-iodo-4-methylphenyl-$N^5$-ethylbiguanide
$N^1$-3-iodo-4-methylphenyl-$N^5$-methyl-$N^5$-iodophenylbiguanide
$N^1$-3-iodo-4-methylphenyl-$N^5$-methyl-$N^5$-n-propylbiguanide
$N^1$-3-bromo-4-methylphenyl-$N^5$-isopropylbiguanide
$N^1$-3-bromo-4-methylphenyl-$N^5$-ethylbiguanide
$N^1$-3-bromo-4-methylphenyl-$N^5$-n-propylbiguanide
$N^1$-3-bromo-4-methylphenyl-$N^5$-methyl-$N^5$-isopropylbiguanide
$N^1$-3-bromo-4-methylphenyl-$N^5$-methyl-$N^5$-n-propylbiguanide
$N^1$-3-bromophenyl-$N^1$-methyl-$N^5$-isopropylbiguanide
$N^1$-3-iodo-4-chlorophenyl-$N^1$-methyl-$N^5$-isopropylbiguanide
$N^1$-3-bromo-4-methylphenyl-$N^1$-methyl-$N^5$-isopropylbiguanide
$N^1$-4-iodo-3-methylphenyl-$N^1$-methyl-$N^5$-isopropylbiguanide.

All these substances may be made by one or more of the methods hereinbefore set forth.

The new compounds are strong bases; they form stable salts with organic and inorganic acids which in many cases are freely soluble in water. The salts may be made by dissolving the biguanides themselves in aqueous solutions of the acid and then evaporating off the water, but they are more conveniently obtained in a dry form by mixing the components together in an organic solvent such as for example acetone, or an alcohol, in which the salt is sparingly soluble. For use chemotherapeutically it is frequently an advantage to apply the new compounds in the form of their salts, especially those salts which are water-soluble. For this purpose there may be used for example the acetates, propionates, butyrates, crotonates, formates, malonates, succinates, glycollates, tartrates, citrates, hydrochlorides, nitrates, sulphates, lactates, methanesulphonates, methylene disalicylates or the methylene-bis-$\beta$-hydroxynaphthoates, or the glycine salts, but it will be understood that many other salts may equally be used, it being understood that for use in the treatment of human malaria it is not desirable to use the salt of an acid which, of itself, possesses toxic properties.

The following examples illustrate but do not limit the invention. The parts are by weight.

Example 1

19.5 parts of p-chlorophenyl-dicyandiamide, 20 parts of diethylamine, 140 parts of ethyl alcohol, and a solution of 12.5 parts of copper sulphate pentahydrate in 60 parts of water are mixed and the mixture is stirred and heated under reflux for 2 hours. The resultant suspension is cooled, diluted with 300 parts of water and filtered. The light-brown solid residue which is mainly the copper complex of $N\alpha$-p-chlorophenyl-$N\omega$-diethylbiguanide, is dissolved in a mixture of 100 parts of 36% hydrochloric acid and 600 parts of water. A solution of 40 parts of sodium sulphide nonahydrate in 100 parts of water is slowly added. Copper sulphide is precipitated and is filtered off. The clear filtrate is made strongly alkaline with caustic soda. The precipitate of the crude biguanide so formed is collected, dried and crystallised from petroleum ether. It forms colourless needles which melt at 133°–134° C., uncorr.

In a similar manner, there may be obtained the following biguanides having the melting points indicated.

Example 2

$N\alpha$ - p - chlorophenyl-$N\omega$-dimethylbiguanide; colourless plates from toluene, M. P. 169° C. uncorr.

Example 3

$N\alpha$ - p - chlorophenyl - $N\omega$ - methyl - $N\omega$ - isopropylbiguanide; colourless needles from toluene, M. P. 174–175° C. uncorr.

Example 4

$N\alpha$-p-chlorophenyl-$N\omega$-ethylbiguanide; colourless prisms from toluene, M. P. 99–101° C.

Example 5

$N\alpha$-p-chlorophenyl-$N\omega$-n-amylbiguanide; colourless needles from water, M. P. 229° C.

Example 6

$N\omega$-p-chlorophenyl-$N\alpha$-n-propylbiguanide; colourless crystals from ethanol, M. P. 58.5°–6° C.

Example 7

$N\alpha$ - p - chlorophenyl-$N\omega$-isopropylbiguanide; colourless crystals from aqueous ethanol, M. P. 130°–131° C.; the acetate forms colourless crystals from acetone, M. P. 188–189° C.

Example 8

$N\alpha$ - p - chlorophenyl - $N\omega$ - n - butylbiguanide acetate; colourless prisms from acetone, M. P. 158° C.

Example 9

$N\alpha$-p-chlorophenyl-$N\omega$-isobutylbiguanide hydrochloride; colourless plates from acetone, M. P. 232° C.

Example 10

$N\alpha$-p-chlorophenyl-$N\omega$-tert-butylbiguanide hydrochloride; colourless crystals from acetone, M. P. 232°–234° C.

Example 11

$N\alpha$ - p - chlorophenyl-$N\omega$-n-propylbiguanide; colourless plates from toluene, M. P. 125°–126° C.

Example 12

$N\alpha$ - p - chlorophenyl-$N\alpha$-methyl-$N\omega$-diethylbiguanide; the hydrochloride crystallises from water in colourless prisms, M. P. 182–184° C.

Example 13

A mixture of 12.6 parts of $N^3$-isopropyldicyandiamide and 25 parts of m-chloroaniline hydrochloride dissolved in 250 parts of water is boiled under reflux for 3 hours. The solution is cooled and crystallisation is induced by scratching with a glass rod. The crystals are filtered off, washed with a little cold water and then dried. They are then suspended in 50 parts of acetone, stirred for 10 minutes, filtered and washed with a little acetone. Recrystallisation from water then gives pure $N^1$-m-chlorophenyl-$N^5$-isopropylbiguanide hydrochloride which melts at 232° C.

Example 14

A mixture of 12.6 parts of $N^3$-isopropyldicyandiamide, 19 parts of N-methyl-p-chloroaniline hydrochloride and 150 parts of water is heated under reflux for 3 hours. It is then cooled and the precipitated crystals are filtered off and washed with a little water. The dried material is slurried with a little ethyl acetate, filtered, washed with ethyl acetate and dried. It is then redissolved in hot water, the solution is clarified by refluxing for 10 minutes with decolourising carbon, then filtered and allowed to cool and crystallise. There is thus obtained $N^1$-p-chlorophenyl-$N^1$-methyl-$N^5$-isopropylbiguanide hydrochloride, which melts at 235–6° C.

Example 15

A mixture of 12.6 parts of $N^3$-isopropyldicyandiamide, 22 parts of 3:4-dichloroaniline hydrochloride and 100 parts of β-ethoxyethanol is heated under reflux for 3 hours. It is then allowed to cool and the crystals which separate are filtered off and washed with a little β-ethoxyethanol. A further crop of crystals is obtained by the addition of 3 volumes of ethyl acetate to the mother liquor. The total material thus obtained is dissolved in hot alcohol, the solution is clarified by refluxing for 15 minutes with decolourising carbon, then filtered and allowed to cool and crystallise. There is thus obtained $N^1$-3:4-dichlorophenyl-$N^5$-isopropylbiguanide hydrochloride, which melts at 244–5° C.

Example 16

A mixture of 12.6 parts of $N^3$-isopropyldicyandiamide, 25 parts of 3:5-dichloroaniline hydrochloride and 100 parts of β-ethoxyethanol is heated under reflux for 3 hours. It is then cooled, 200 parts of ethyl acetate are added and the mixture is allowed to stand for 1 hour. The crystals which separate are filtered off and washed with a mixture of β-ethoxyethanol and ethyl acetate. They are then dissolved in hot water, the solution is clarified by refluxing for 10 minutes with decolourising carbon, then filtered and allowed to cool. The crystals which separate are filtered off, washed and dried. There is thus obtained $N^1$-(3:5-dichlorophenyl)-$N^5$-isopropylbiguanide hydrochloride, which melts at 239–240° C.

Example 17

A mixture of 12.6 parts of $N^3$-isopropyldicyandiamide, 25.6 parts of 3:4:5-trichloroaniline hydrochloride and 100 parts of water is heated to boiling under reflux. Sufficient β-ethoxyethanol to bring about complete solution is added and the mixture is boiled for 3 hours. It is then allowed to cool and a crop of crystals separate. This is filtered off and washed with aqueous β-ethoxyethanol. It is then dissolved in hot alcohol, the solution is clarified by refluxing for 15 minutes with decolourising carbon, then filtered and allowed to cool. The crystals which separate are filtered off, washed and dried. There is thus obtained $N^1$-(3:4:5-trichlorophenyl)-$N^5$-isopropylbiguanide hydrochloride, which melts at 254–5° C.

Example 18

A mixture of 14 parts of $N^3$-methyl-$N^3$-isopropyldicyandiamide, 18 parts of m-chloroaniline hydrochloride and 150 parts of water is heated under reflux for 90 minutes. It is then allowed to cool and the crystals which are deposited are filtered off, washed with water and dried. These are slurried with a little ethyl acetate, then filtered off and washed with ethyl acetate. They are then dissolved in hot water, the solution is clarified by refluxing for 10 minutes with decolourising carbon, then filtered and allowed to cool. The crystals which separate are filtered off, washed and dried. There is thus obtained $N^1$-m-chlorophenyl-$N^5$-methyl-$N^5$-isopropylbiguanide hydrochloride, which melts at 234° C.

Example 19

A mixture of 4.0 parts of $N^3$:$N^3$-diethyldicyandiamide, 4.7 parts of m-chloroaniline hydrochloride and 10 parts of β-ethoxyethanol is boiled under reflux for 30 minutes. The mixture is cooled, diluted with ethyl acetate and the crystalline solid is filtered off and washed with ethyl acetate. It is then dried and purified by crystallisation from water giving $N^1$-m-chlorophenyl-$N^5$-diethylbiguanide hydrochloride, M. P. 226–227° C.

Example 20

To a solution of 8.9 parts of 3-chloro-4-methylaniline hydrochloride in 50 parts of β-ethoxyethanol maintained at the boil under reflux condenser there is added 6.3 parts of $N^3$-isopropyldicyandiamide. After a few minutes the mixture is cooled, diluted with 100 parts of ethyl acetate and the crystalline precipitate is filtered off, washed with ethyl acetate and dried at 65° C. It is then recrystalised from water and $N^1$-(3-chloro-4-methylphenyl)-$N^5$-isopropylbiguanide hydrochloride is obtained. It has M. P. 256° C.

Example 21

In a similar manner using equivalent amounts of appropriate intermediates there are made $N^1$-4-chloro-3-methylphenyl-$N^5$-isopropylbiguanide hydrochloride, M. P. 243–245° C., $N^1$-3:4:5-trichlorophenyl-$N^5$-n-propylbiguanide hydrochloride, M. P. 228–229° C. and $N^1$-3:4:5-trichlorophenyl-$N^5$-methyl-$N^5$-isopropylbiguanide hydrochloride, M. P. 234–235° C.

Example 22

3.66 parts of n-propylamine hydrochloride, 7.2 parts of m-iodophenyldicyandiamide and 21.5 parts of nitrobenzene are heated together at 135° C. for 18 hours. On cooling the semi-solid mass obtained is digested with 7% hydrochloric acid and ether, the mixture filtered and the two layers in the filtrate separated. The acid aqueous solution is made slightly alkaline with ammonia and the solid precipitated is filtered off, washed with acetone and crystallised from water. $N^1$-m-iodophenyl-$N^5$-n-propylbiguanide hydrochloride, M. P. 208–209° C. is thus obtained as colourless prisms.

By working in the manner described in Example 1 using other appropriate intermediates, there are obtained the following further biguanides.

Example 23

$N^1$-4-chloro-3-bromophenyl-$N^5$-n-propylbiguanide hydrochloride, of M. P. 197–198° C.

Example 24

$N^1$-p-iodophenyl - $N^5$-isobutylbiguanide hydrochloride of M. P. 231–231.5° C.

Example 25

$N^1$-3-bromo - 4 - iodophenyl-$N^5$-n-propylbiguanide hydrochloride of M. P. 227–228° C.

Example 26

$N^1$-3-bromo - 4 - iodophenyl-$N^5$-ethylbiguanide hydrochloride of M. P. 220–221° C.

Example 27

$N^1$-3:4-dibromophenyl-$N^5$ - n - propylbiguanide hydrochloride of M. P. 217.5–218° C.

Example 28

$N^1$ - m - iodophenyl-$N^5$-ethylbiguanide hydrochloride of M. P. 226–227° C.

Example 29

$N^1$-m-bromophenyl-$N^5$-ethylbiguanide hydrochloride of M. P. 216–217° C.

Example 30

$N^1$-4-chloro-3-bromophenyl-$N^5$-ethylbiguanide hydrochloride of M. P. 215–216° C.

Example 31

$N^1$-4-bromo - 3 - iodophenyl-$N^5$-ethylbiguanide hydrochloride of M. P. 200–201° C.

Example 32

$N^1$-4-chloro - 3 - iodophenyl-$N^5$-n-propylbiguanide hydrochloride of M. P. 198–199° C.

Example 33

$N^1$-4-chloro-3-bromophenyl - $N^5$ - methyl - $N^5$-n-propylbiguanide hydrochloride of M. P. 232–232.5° C.

Example 34

$N^1$-3:4-dibromophenyl-$N^5$-methyl - $N^5$ - isopropylbiguanide hydrochloride of M. P. 234–235° C.

Example 35

$N^1$-4-chloro-3-bromophenyl-$N^5$-methyl-$N^5$-isopropylbiguanide hydrochloride of M. P. 240–241° C.

Example 36

$N^1$-o-bromophenyl-$N^5$ - methyl-$N^5$-n-propylbiguanide hydrochloride of M. P. 237° C.

Example 37

$N^1$-3-chloro-4-iodophenyl - $N^5$ - methyl-$N^5$-n-propylbiguanide hydrochloride of M. P. 229–230° C.

Example 38

$N^1$-3:4-diiodophenyl - $N^5$-methyl-$N^5$-isopropylbiguanide hydrochloride of M. P. 235° C.

Example 39

$N^1$-4-bromo - 3 - iodophenyl-$N^5$-methyl-$N^5$-isopropylbiguanide hydrochloride of M. P. 241–242° C.

Example 40

$N^1$-4 - bromo-3-iodophenyl - $N^5$ - methyl-$N^5$-n-propylbiguanide hydrochloride of M. P. 208–209° C.

Example 41

$N^1$-p-iodophenyl-$N^5$-methyl - $N^5$ - n - propylbiguanide hydrochloride of M. P. 238° C.

Example 42

$N^1$-4 - chloro - 3 - iodophenyl-$N^5$-methyl-$N^5$-n-propylbiguanide hydrochloride of M. P. 205–206° C.

Example 43

$N^1$-4-chloro-3-iodophenyl - $N^5$ - methyl-$N^5$-isopropylbiguanide hydrochloride of M. P. 239–240° C.

Example 44

23 parts of p-bromoaniline are suspended in water and sufficient hydrochloric acid added to give a solution just acid to Congo red. This solution is then diluted to 375 parts with water and 12.6 parts of $N^3$-isopropyldicyandiamide are added. The mixture is refluxed for 3 hours and then allowed to cool. The solid which separates is filtered off and washed with a little water. Recrystallisation from water after clarification of the solution with decolourising charcoal gives a product which has a brownish tinge and a faint odour of p-bromoaniline. It is suspended in a little dry acetone, stirred for 10 minutes, then filtered and washed with a little acetone. A further recrystallisation from water gives pure $N^1$-p-bromophenyl - $N^5$-isopropylbiguanide hydrochloride which melts at 246° C.

Example 45

A mixture of 12.6 parts of $N^3$-isopropyldicyandiamide, 24.3 parts of 3-chloro-4-bromoaniline hydrochloride and 100 parts of β-ethoxyethanol is heated under reflux for 3 hours. It is then allowed to cool and the crystals which separate are filtered off and washed with a little β-ethoxyethanol. A further crop of crystals is obtained by the addition of 3 volumes of ethyl acetate to the mother liquor. The total material thus obtained is dissolved in hot alcohol, the solution is clarified by refluxing for 15 minutes with decolourising carbon, then filtered and allowed to cool and crystallise. There is thus obtained $N^1$-3 - chloro-4-bromophenyl-$N^5$-isopropylbiguanide hydrochloride which melts at 226° C.

Example 46

A mixture of 12.6 parts of $N^3$-isopropyldicyandiamide, 26 parts of p-iodoaniline hydrochloride and 100 parts of β-ethoxyethanol is heated under reflux for 3 hours. It is then cooled, 200 parts of ethyl acetate are added and the mixture is allowed to stand for 1 hour. The crystals which separate are filtered off and washed with a mixture of β-ethoxyethanol and ethyl acetate. They are then dissolved in hot water, the solution is clarified by refluxing for 10 minutes with decolourising carbon, then filtered and allowed to cool. The crystals which separate are filtered off, washed and dried. There is thus obtained $N^1$ - p - iodophenyl-$N^5$-isopropylbiguanide hydrochloride, which melts at 239° C.

Example 47

A mixture of 14 parts of $N^3$-methyl-$N^3$-isopropyldicyandiamide, 28 parts of p-iodoaniline hydrochloride and 200 parts of β-ethoxyethanol is heated under reflux for 1 hour. The mixture is allowed to cool and the crystals which separate are filtered off and washed with a little β-ethoxyethanol. They are then dissolved in hot water and the solution is clarified by boiling for 10 minutes with decolourising carbon, then filtered and allowed to cool. The crystals which separate are filtered off, washed and dried. There is thus obtained $N^1$-p-iodophenyl-$N^5$-methyl-$N^5$-isopropylbiguanide hydrochloride, which melts at 243–4° C.

Example 48

A mixture of 4.1 parts of $N^3$-ethyldicyandiamide, 8.0 parts of p-bromoaniline hydrochloride and 20 parts of β-ethoxyethanol is boiled under reflux for 105 minutes. It is then cooled and the crystalline solid is filtered off and dissolved in dilute hydrochloric acid. The solution is filtered, neutralised with ammonia and salted out with common salt. The $N^1$-p-bromophenyl-$N^5$-ethylbiguanide hydrochloride thereby precipitated is filtered off and purified by crystallisation from water. It has M. P. 233–234° C.

By working in a similar manner using appropriate intermediates there may also be made the following substances:

Example 49

$N\alpha$-m-bromophenyl-$N\omega$-isopropylbiguanide hydrochloride, M. P. 226° C.

Example 50

$N\alpha$-p-bromophenyl-$N\omega$-n-propylbiguanide hydrochloride which crystallises from water in colourless plates, M. P. 221–222° C.

Example 51

$N\alpha$-p-bromophenyl-$N\omega$-methyl-$N\omega$-isopropylbiguanide mono-hydrochloride which crystallises from water in colourless needles, M. P. 251° C.

Example 52

$N^1$-3:5-dichloro-4-bromophenyl-$N^5$-isopropylbiguanide hydrochloride, M. P. 244–245° C.

Example 53

$N^1$-3-iodophenyl-$N^5$-isopropylbiguanide hydrochloride, M. P. 246° C.

Example 54

$N^1$-4-chloro-3-bromophenyl-$N^5$-isopropylbiguanide hydrochloride, M. P. 239° C.

Example 55

$N^1$-4-iodo-3-bromophenyl-$N^5$-isopropylbiguanide hydrochloride, M. P. 236° C.

Example 56

$N^1$-3:4-dibromophenyl-$N^5$-isopropylbiguanide hydrochloride, M. P. 240° C.

Example 57

$N^1$-4-bromo-3-iodophenyl-$N^5$-isoproylbiguanide hydrochloride, M. P. 239° C.

Example 58

$N^1$-3:4-diiodophenyl-$N^5$-isopropylbiguanide hydrochloride, M. P. 237° C.

Example 59

$N^1$-4-chloro-3-iodophenyl-$N^5$-isopropylbiguanide hydrochloride, M. P. 258° C.

Example 60

$N^1$-p-bromophenyl-$N^5$-sec.butylbiguanide hydrochloride, M. P. 255–256° C.

Example 61

$N^1$-3-chloro-4-bromophenyl-$N^5$-ethylbiguanide hydrochloride, M. P. 217° C.

Example 62

$N^1$-3-chloro-4-bromophenyl-$N^5$-n-propylbiguanide hydrochloride, M. P. 217° C.

Example 63

$N^1$-3-chloro-4-iodophenyl-$N^5$-ethylbiguanide hydrochloride, M. P. 226–227° C.

Example 64

$N^1$-3-chloro-4-iodophenyl-$N^5$-n-propylbiguanide hydrochloride, M. P. 225° C.

Example 65

$N^1$-m-bromophenyl-$N^5$-n-propylbiguanide hydrochloride, M. P. 194–195° C.

Example 66

$N^1$-p-iodophenyl-$N^5$-ethylbiguanide hydrochloride, M. P. 239–240° C.

Example 67

$N^1$-p-iodophenyl-$N^5$-n-propylbiguanide hydrochloride, M. P. 222–224° C.

Example 68

$N^1$-p-iodophenyl-$N^5$-n-butylbiguanide hydrochloride, M. P. 207° C.

Example 69

$N^1$-4-chloro-3-iodophenyl-$N^5$-ethylbiguanide hydrochloride, M. P. 197–198° C.

Example 70

$N^1$-3-chloro-4-bromophenyl-$N^5$-methyl-$N^5$-n-propylbiguanide hydrochloride, M. P. 234° C.

Example 71

$N^1$-3-chloro-4-bromophenyl-$N^5$-methyl-$N^5$-isopropylbiguanide hydrochloride, M. P. 244° C.

Example 72

$N^1$-3-chloro-4-iodophenyl-$N^5$-methyl-$N^5$-isopropylbiguanide hydrochloride, M. P. 231° C.

Example 73

10.6 parts of p-bromophenylguanide hydrate and 25 parts of pentanol are mixed, heated to the boil and 15 parts of pentanol distilled from the mixture. 3.9 parts of diethylcyanamide are then added to the dry pentanol solution of the guanidine and the mixture is boiled under reflux for 2.5 hours. The reaction mixture is cooled and diluted with 50 parts of benzene and the whole is extracted with 10 parts of 7% hydrochloric acid. The acid extract is made alkaline with excess sodium hydroxide solution and filtered. The solid is crystallised from petroleum ether and there is obtained $N^1$-p-bromophenyl-$N^5$:$N^5$-diethylbiguanide as colourless plates, M. P. 140–141° C.

By working in a similar manner and using other appropriate starting materials there may be obtained the following further biguanides.

Example 74

$N^1$-bromophenyl-$N^5$-isobutylbiguanide; its monohydrochloride crystallises from water in colourless plates, M. P. 237–238° C.

Example 75

$N^1$-p-bromophenyl-$N^5$-methyl-$N^5$-n-butylbiguanide; it crystallises from petroleum ether in colourless plates, M. P. 123–124° C.

Example 76

$N^1$-p-bromophenyl-$N^5$-dimethylbiguanide; it crystallises from ethanol in colourless needles, M. P. 175–176° C.

Example 77

$N^1$-p-bromophenyl-$N^5$-cyclohexylbiguanide; it crystallises from benzene in colourless plates, M. P. 181–182° C.; its monohydrochloride crystallises from water in colourless needles, M. P. 252–253° C.

While it will be understood that medical utility in the treatment of human malaria may be formally asserted only after extensive clinical trials, it has been found that the efficacy of a substance in avian malaria, particularly in *Plasmodium gallinaceum* infection of chicks, is a good indication of its utility in the treatment of human malaria. Moreover, efficacy against the exo-erythrocytic forms of avian malaria organisms is generally indicative of utility as a causal prophylactic in human malaria. Utility as a causal prophylactic is a very desirable feature of an antimalarial agent and this feature is not possessed by quinine. Quinine is merely curative and, to a degree, clinically prophylactic, these properties being generally indicated by efficacy against the erythrocytic forms in avian malaria. Thus, the compounds of the present invention possess generally a very important advantage in comparison with quinine. Yet a further advantage presented especially by some of the compounds of the present invention is that we have found that they are effective at a dosage which is much smaller in relation to the toxic dose than in the case with many pre-existing antimalarial agents.

Moreover, as indicated above, the compounds of the present invention are readily made by a number of relatively simple chemical processes and from cheap, or potentially cheap, starting materials. For this they show a clear advantage over many already known synthetic antimalarial agents, notably over Mepacrine which is 2-chloro-5($\omega$-diethylamino-$\alpha$-methylbutylamino)-7-methoxyacridine. Also being colourless, they do not possess the undesirable property of staining the skin of the patient.

We claim:

1. As a new compound, N'-(p-chloro-m-methylphenyl)-$N^5$-isopropylbiguanide.

2. A compound of the general formula:

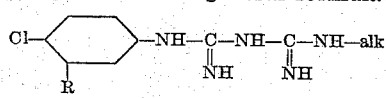

wherein R is a 1 to 3 carbon atom alkyl radical and "alk" is a lower alkyl radical.

FRANCIS HENRY SWINDEN CURD.
FRANCIS LESLIE ROSE.

REFERENCES CITED

The following references are of record in the file of this patent:

Curd et al.: "Annals Tropical Med. and Parasitology," vol. 39, December 31, 1945, pp. 208–219.

Spinks et al.: "Annals Tropical Med. and Parasitology," vol. 39, December 31, 1945, pp. 220–224.